S. Lloyd,
Horseshoe.
Nº 46,192. Patented Jan. 31, 1865.
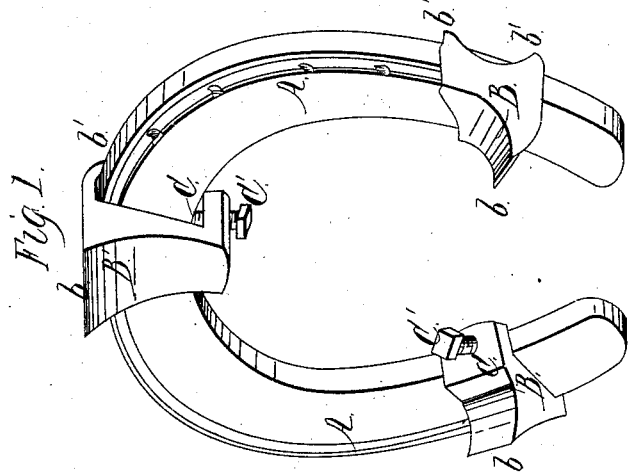
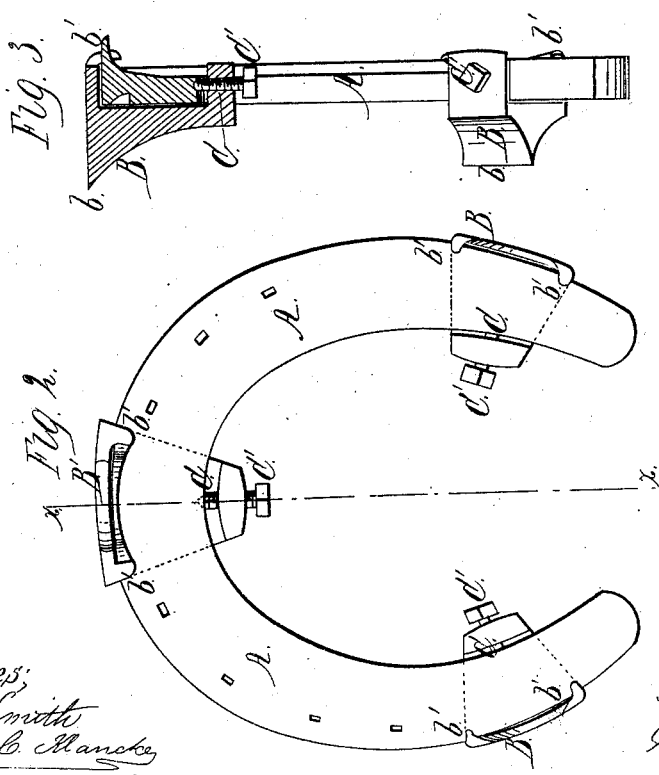
Witnesses:
C. D. Smith
Alex. A. C. Mancke
Inventor:
Sam Lloyd

UNITED STATES PATENT OFFICE.

SAMUEL LLOYD, OF WASHINGTON, DISTRICT OF COLUMBIA, ASSIGNOR TO HIMSELF AND WM. H. FREAR, OF SAME PLACE.

IMPROVED MOVABLE CALK AND TOE FOR HORSESHOES.

Specification forming part of Letters Patent No. 46,192, dated January 31, 1865.

*To all whom it may concern:*

Be it known that I, SAMUEL LLOYD, of the city and county of Washington, in the District of Columbia, have invented a new and useful Improvement in Movable Calks and Toes for Horseshoes; and I do hereby declare the following to be a full and exact description of the same, reference being had to the accompanying drawings, which make part of this specification, and in which—

Figure 1 is an under side perspective view of a horseshoe illustrating my invention. Fig. 2 is a top view of the same. Fig. 3 is a section the plane of which is indicated by the line $x\,x$, Fig. 2.

Similar letters of reference indicate corresponding parts in the several figures.

The object of the invention is to provide novel and improved calks and toes for arming the hoofs of horses and other shodden animals, to prevent them from slipping and enable them to travel easily with their burden upon the ice.

The invention consists, chiefly, in a peculiar manner of constructing the calks and toes, and in the employment therewith of jam-nuts and screws, the several devices adapting the animal to be armed without the necessity of first removing the shoe, all as will be hereinafter explained.

In order that others skilled in the art to which my invention appertains may be enabled to fully understand and use the same, I will proceed to describe its construction and operation.

A represents a horseshoe of common construction; B B, the side calks, and B' the toe-calk. Each calk is formed with a sharp edge or point, $b$, adapted to penetrate the ice and retain the foot of the animal in a firm condition, thus preventing falling or slipping, and enabling the animal to travel with the usual speed. The calks are each formed with a recess, as represented in the drawings, so that when applied to the foot they embrace the bottom and vertical faces of the shoe.

On the side of the calk B or B' which rests against the outer vertical face of the shoe are formed lips $b'\,b'$, which, by being bent inward and down upon the upper face of the shoe A, serve as fastenings for the calk at one side, while the screw C secures it at the other side. The screw C is formed with a square head, C', and may be pointed, and they work through threaded holes in the inner parts or flanges of the calks. By turning the heads C' their respective screws C are forced against the inner vertical face of the shoe, the steel points of the screws forming holes or indentations adapted to retain them in an immovable position. By thus turning the heads C' the calks can be tightened upon the shoe to any desirable extent, the rotation of the screw C serving to draw the outer flange of the calk into firm contact with the outer vertical face of the shoe A. In some cases the size of the calk relatively to that of the shoe may be such as to render it desirable to have a jam-nut fixed upon the opposite end of the screw C from that on which the head C' is formed, so that such nut will occupy a position between the inner flange of the calk and the inner face of the shoe. Therefore I propose to employ two nuts with one screw—a small nut to subserve the purpose just mentioned, and a larger one to work on the inner end of the screw, to jam said screw and prevent its working loose.

The body of the calks may be made of malleable iron to facilitate bending, while the points may be made of steel or be case-hardened to increase their durability. They may be made of any other suitable metal.

Having thus described my invention, what I claim as new, and desire to secure by Letters Patent, is—

The calks B B', constructed in the manner herein described and represented, and employed in connection with the screws C C', in the manner and for the object specified.

SAML. LLOYD.

Witnesses:
C. D. SMITH,
ALEX. A. C. KLANCK.